United States Patent [19]

Tokudome et al.

[11] Patent Number: 5,728,299
[45] Date of Patent: Mar. 17, 1998

[54] WOUND NON-WOVEN FABRIC FILTER HAVING HEAT FUSIBLE FIBERS

[75] Inventors: Shinichi Tokudome; Satoshi Ogata, both of Shigaken; Katsuhiro Shishikura, Chibaken, all of Japan

[73] Assignee: Chisso Corporation, Osaka, Japan

[21] Appl. No.: 726,224

[22] Filed: Oct. 4, 1996

[30] Foreign Application Priority Data

Oct. 25, 1995 [JP] Japan .................................. 7-300671

[51] Int. Cl.⁶ .................................................. B01D 39/16
[52] U.S. Cl. .................. 210/497.01; 210/503; 428/35.9; 428/36.3; 428/296.7; 156/187; 264/113; 55/486; 55/528
[58] Field of Search .................. 55/486, 528; 210/494.1, 210/497.1, 497.01, 503; 428/35.9, 36.3, 36.91, 296.7, 297.1, 377, 395; 156/184, 187, 188, 296; 264/113, 136, 137

[56] References Cited

U.S. PATENT DOCUMENTS

| | | | |
|---|---|---|---|
| 3,262,578 | 7/1966 | Dennis | 210/494.1 |
| 4,659,785 | 4/1987 | Nagano et al. | 428/516 |
| 4,660,779 | 4/1987 | Nemesi et al. | 210/494.1 |
| 4,752,396 | 6/1988 | Schmitt | 210/494.1 |
| 4,801,383 | 1/1989 | Hoffmann et al. | 210/497.1 |
| 5,244,482 | 9/1993 | Hassenboehler, Jr. et al. | 55/528 |
| 5,599,366 | 2/1997 | Hassenboehler, Jr. et al. | 55/486 |

FOREIGN PATENT DOCUMENTS

| | | |
|---|---|---|
| 53-43709 | 11/1978 | Japan . |
| 56-43139 | 10/1981 | Japan . |
| 61-102470 | 5/1986 | Japan . |
| 61-121922 | 8/1986 | Japan . |
| 2-57114 | 4/1990 | Japan . |
| 4-145914 | 5/1992 | Japan . |
| 5-192516 | 8/1993 | Japan . |

*Primary Examiner*—W. L. Walker
*Attorney, Agent, or Firm*—Lowe, Price, Leblanc & Becker

[57] ABSTRACT

The cartridge filter of the present invention is a filter comprising a wound and laminated composite non-woven fabric containing heat fusible fibers, wherein the delamination strength between layers of the laminated composite non-woven fabric of said filter increases continuously or discontinuously from the outer layer toward the inner layer, the delamination strength of the inner layer exceeds 1000 gf/5 cm, and the delamination strength of the outer layer is 5 to 1000 gf/5 cm. This cartridge excels in filtering life, filtering accuracy, and pressure resistance.

6 Claims, No Drawings

WOUND NON-WOVEN FABRIC FILTER HAVING HEAT FUSIBLE FIBERS

BACKGROUND OF THE INVENTION

1. Field of the Invention

The present invention relates to a novel cartridge filter, and more specifically to a cartridge filter capable of stable filtration and comprising heat-fusible fibers that have a high pressure resistance even when not provided with a porous core tube.

2. Description of the Related Art

As cartridge filters for filtering out particles contained in a gas or a liquid, a spindle-like cartridge filter comprising a tubular porous material around which twist yarn is wound is disclosed in Japanese Utility Model Application Laid-open No. 61-121922; a cartridge filter comprising a tubular porous material around which a web sheet is wound is disclosed in Japanese Patent Application Laid-open No. 5-192516; and a cartridge filter comprising heat-adhesive composite fiber web molded into a tubular shape is disclose in Japanese Patent Publication No. 53-43709. These are suitable and widely used for cleaning filtration of various liquids and gases in general industries such as the motor vehicle, food, electronic and electrochemical industries, for water treatment of swimming pools, and for purification treatment of sewage and factory waste water.

Since the spindle-like cartridge filter according to Japanese Utility Model Application Laid-open No. 61-121922 comprises a filter material formed by spirally winding around a tubular porous material multiple layers of porous paper, non-woven fabrics, or multifilaments twisted into yarn or rope, this method is advantageous in that the production costs are low.

On the other hand, since the cartridge filter comprising wound web sheets according to Japanese Patent Application Laid-open No. 5-192516 is formed by forming fibers into a wide fiber web sheet, and winding it around a tubular porous material perpendicularly to the axial direction thereof, this method is also advantageous in that production costs are low, as they are in the spindle-like cartridge filter.

The filter cartridge according to Japanese Patent Publication No. 53-43709 formed by molding a heat-adhesive composite fiber web into a cylindrical form is advantageous in that no delamination between fibers occurs even when filtration pressure rises, and a stable filtering accuracy is achieved.

However, the cartridge filter according to Japanese Utility Model Application Laid-open No. 61-121922 comprising yarn or rope has problems in that stable filtration cannot be achieved because diameters of voids formed between filtering media are changed by the movement of filtering media due to rise in filtration pressure accompanying the progress of filtration, and because a part of filtering media falls into and mixes with the filtrate during passage of the liquid.

Also, since the filter cartridge according to Japanese Patent Application Laid-open No. 5-192516 is formed by simply winding a fiber web sheet, the fibers and layers of the filtering media are not adhered to each other. This causes various problems in that layers are delaminated, or voids formed between filtering media are deformed by a rise in filtration pressure accompanying the progress of filtration, and that a part of filtering media may fall into and mix with the filtrate during passage of the liquid, resulting in inconsistent filtering accuracy.

Furthermore, in the filter cartridge according to Japanese Patent Publication No. 53-43709, since the variation of void diameters is small, when the cartridge filter is used to filter fluid containing particles with a wide distribution of particle diameter, filtration is apt to become surface filtration, and is not satisfactory.

SUMMARY OF THE INVENTION

The inventors of the present invention conducted repeated studies for solving the above problems, and found that the above problems were solved by the constitution described below, and thus completed the present invention.

According to a first aspect of the present invention, there is provided a filter comprising a wound and laminated composite non-woven fabric containing heat fusible fibers, wherein the delamination strength between layers of the laminated composite non-woven fabric of said filter increases continuously or discontinuously from the outer layer toward the inner layer; the delamination strength of the inner layer exceeds 1000 gf/5 cm, and the delamination strength of the outer layer is 5 to 1000 gf/5 cm.

According to a second aspect of the present invention, there is provided a filter according to the first aspect, wherein the outer layer comprises a surface layer having a delamination strength of 5 to 500 gf/5 cm and made of the laminated composite non-woven fabric, and an intermediate layer located under said surface layer, having a delamination strength of 500 to 1000 gf/5 cm, and made of the laminated composite non-woven fabric.

According to a third aspect of the present invention, there is provided a filter according to the first aspect, wherein the delamination strength of the surface layer region is 5 to 500 gf/5 cm, and the delamination strength of the inner layer exceeds 1000 gf/5 cm, and the delamination strength varies continuously within the region between these two layers.

According to a fourth aspect of the present invention, there is provided a filter according to any of the first through third aspects, wherein the composite non-woven fabric is a composite short-fiber non-woven fabric consisting of a high melting point component and a low melting point component, the difference between melting points of these components being at least 10° C.

According to a fifth aspect of the present invention, there is provided a filter according to any of the first through third aspects, wherein the composite non-woven fabric is a composite long fiber non-woven fabric consisting of a high melting component and a low melting point component, difference in melting points between these components being at least 10° C.

According to a sixth aspect of the present invention, there is provided a filter according to any of the first through third aspects, wherein the composite non-woven fabric is a melt-blown non-woven fabric consisting of a high melting point component and a low melting point component, the difference between melting points of these components being at least 10° C.

The present invention will be described in detail below.

As a composite non-woven fabric constituting a filter according to the present invention, card web, random web, and the like are suitable; however, web produced by opening a continuous bundle of fibers, collective fibers produced by stitch-bonding fiber web, or non-woven fabrics produced by spun-bonding or melt-blown methods may also be used.

Heat-fusible fibers constituting the composite non-woven fabric include single component synthetic thermoplastic fibers produced from polyethylene, polypropylene, polyesters, or polyamides; as well as heat-fusible composite fibers consisting of two or more synthetic polymer components whose melting point difference is 10° C. or more, preferably 15° C. or more. Examples of such heat-fusible composite fibers are composite fibers having a side-by-side cross-sectional structure, or sheath-and-core type or eccentric sheath-and-core type composite fibers having a low melting point component as the sheath component, consisting of the combinations of polyethylene/polypropylene, polyethylene/polyethyleneterephthalate, ethylene-vinyl acetate copolymer/polypropylene, polypropylene/polyethyleneterephthalate, nylon-6/nylon-66, or ethyleneterephthalate copolymer/polyethyleneterephthalate, for low melting point component/high melting point components. However, a difference between melting points of components of less than 10° C. is not preferred because the temperature range of heating upon winding the web becomes narrow.

The weight ratio of low melting point to high melting point components (low melting point component/high melting point component) is preferably between 30/70 and 70/30. If the content of the low melting point component is less than 30 percent, the adhesion of fibers decreases, resulting in a decrease of the shape stability of the composite non-woven fabric, and consequently that of the formed filter. If the content of the low melting point component exceeds 70 percent, sufficient adhesion is achieved, but the heat shrinkage of fibers increases, the dimensional stability of the composite non-woven fabric decreases, and the filter cannot be produced stably.

The cross-sectional form of the fibers used is not limited to circular. If fibers having profiled cross-sectional forms such as trefoil or quatrefoil cross sections are used for producing a filter, higher filtration performance can be expected due to an increase in the adsorption area and the collecting effect at the gaps between projections.

Methods for producing a tubular cartridge filter include the method disclosed in Japanese Patent Publication No. 56-43139 in which the composite non-woven fabric is wound around a core while the fabric is heated, using a far-infrared heater, to a temperature at which only the low melting point component of the heat-fusible fibers melts. For heating the composite non-woven fabric, a through-air type dryer, heat rollers, and the like may also be used in place of the far-infrared heater.

A tubular cartridge filter may also be produced using the spun-bonding method or the melt-blown method by winding the composite non-woven fabric directly produced while being heated in the same manner as described above.

The filter according to the present invention is produced using the above described equipment by adequately adjusting the winding pressure when the composite non-woven fabric is wound. That is, by making winding pressure higher for more inner layers, stronger adhesion between layers is obtained for more inner layers. In other words, delamination strength between layers varies continuously or discontinuously, and the strength at the innermost layer is higher than the strength at the outermost layer.

More specifically, the laminated composite non-woven fabric is composed of an inner layer region having a delamination strength exceeding 1000 gf/5 cm, and an outer layer region having a delamination strength of 5 to 1000 gf/5 cm. The variation of delamination strength between these regions my be continuous or discontinuous. The inner layers used herein are layers located inside of approximately 50 percent of the thickness in the radial direction of the laminate, and the outer layers are layers located outside the inner layers. Although the delamination strength is not required to be identical either within the inner layers or within the outer layers, the value must not decrease toward the inner layer region in the radial direction.

In any of the aspects of the present invention, delamination strength may be varied stepwise, or may be varied continuously. This variance should be selected depending on the distribution, characteristics, or form of particles to be filtered.

Although variance depends on the difference in delamination strength, the delamination strength of a general-purpose cartridge having an outer diameter of 70 mm and an inner diameter of 30 mm will be varied in two or three steps.

An embodiment having three steps of difference in delamination strength is required to have a surface layer region of a delamination strength of 5 to 500 gf/5 cm, an intermediate layer region located under the surface layer region and having a delamination strength of 500 to 1000 gf/5 cm, a higher delamination strength between layers of the laminated composite non-woven fabric than the delamination strength of the surface layer region, and an inner layer region having a value exceeding 1000 gf/5 cm. Surface, intermediate and inner layers described herein are layers in sequence from the surface of the filter when the thickness in the radial direction of the filter is divided into three approximately equal portions. Although the delamination strength within each region is not required to be identical, the values in the inner layers must not be smaller than the values in the outer layers.

In the inner layer region of the filter, for imparting pressure resistance to the filter, it is required that the layers constituting the laminated composite non-woven fabric be firmly adhered to each other, and in the condition difficult to delaminate. Since this inner layer region has firmly fused adhesion points between constituting fibers and since formed gaps will not open, the region may become media layers that determine the filtering accuracy of the filter.

The fact that the delamination strength between layers and between constituting fibers of the laminated composite non-woven fabric is relatively low in the outer layer region, the surface layer region, and the intermediate layer region means that the laminated composite non-woven fabric has a sufficient number of gaps between layers and constituting fibers because the adhesion points between fibers are not firmly compressed and the number of adhesion points is less than the number of adhesion points in the inner layer region described above, and that the proportion of these gaps greatly affects the filtering life of the filter. That is, since fine particles subjected to filtering have a particle diameter distribution, particles having a large diameter are separated and collected, and early clogging of the inner layer region, or the media layers, can be prevented.

However, if the layers of the laminated composite non-woven fabric, or the constituting fibers, are not adhered in the surface layer region or the intermediate layer region, or adhesion is insufficient and the delamination strength is less than 5 gf/5 cm, the layers are compressed by the permeation pressure of the fluid subjected to filtration, and stable filtration cannot be performed due to changes in the gaps between constituting fibers. Therefore, it is essential for filtering layers to contribute to filtration without changing during passage of the fluid, and that the layers and constituting fibers be firmly adhered with each other.

When the layers and constituting fibers of the laminated composite non-woven fabric in the outer layer region or in the surface layer region and the intermediate layer region are adhered with a force exceeding a delamination strength of 1000 gf/5 cm, since the filter excels in pressure resistance but the shape of the gaps in the entire filtering layers does not vary, only the vicinity of the surface layer is apt to contribute to the collection of fine particles subjected to filtration. That is, since fine particles having a particle diameter distribution cannot be classified, and are collected only by the surface layer, the surface of the filter quickly becomes clogged and the filtering life tends to become extremely short.

In order for the cartridge filter of the present invention, which has the above structure, to exhibit stable filtering properties, it is preferred that the end surface of the filter is sealed. That is, since the gap diameter in this filter is increased by lowering the adhesive strength between layers in the outer layer region relative to the inner layer region, fine particles may leak (short pass phenomenon) from the outer layer region on the end surface of the filter, depending on the method of setting the filter in the filter housing. Therefore, it is preferred for stable filtering that the end surface of the filter itself is sealed beforehand. The method for completely sealing the end surface of the filter may be any method known within the art, so long as the end surface of the filter is completely sealed. For example, fixing and sealing the end surface of the filter by adhering a foam or rubber gasket using adhesives is one of the preferred methods.

DETAILED DESCRIPTION OF PREFERRED EMBODIMENTS

The present invention will next be described in detail referring to examples and comparative examples; however, the present invention is not limited to these examples. The delamination tests used in each example and the filtering performance tests for cartridge filters were conducted by methods described below.

When filtering performance was evaluated, the end surface of the filter was sealed by adhering a flat gasket made of cross-linked polyethylene foam using hot-melt adhesives.
[Delamination strength]

A tubular test piece having a width of 5 cm in the lengthwise direction was cut from the filter. Layers in the circumferential direction of the laminated composite non-woven fabric were delaminated, and the delamination strength between each layer was measured. The distance between clamps of the tensile tester used for measurement was 5 cm, and the pulling speed was 10 cm/min. The pulling direction of the composite non-woven fabric was perpendicular to the tangential direction of the circumference of the tubular test piece.
[Filtering accuracy]

A filter (250 mm) was installed in the housing of a circulating filtering performance tester, and water was circulated from a 50-liter water tank using a pump. After adjusting the flow rate to 30 liters per minute, AC coarse test dust (ACCTD) (median diameter: 27–31 μm), which is a standard powder for determining basic properties, was continuously added into the water tank as test powder at a rate of 60 mg/min, and 5 minutes after the start of addition, the sample liquid and the filtrate were sampled to measure particle size distribution of particles contained in the liquid using a light-blocking particle detector. Based on the results of particle size distribution measurement, the proportion of the number of particles collected by the filter was calculated as the collection efficiency, and the particle diameter at which 99.9 percent of the particles were collected was designated as the filtering accuracy of the filter.

[Filtering life and pressure resistance]

A filter (250 mm) was installed in the housing of the circulating filtering performance tester described above, and water was circulated at a flow rate of 30 liters per minute. ACCTD was added at a rate of 400 mg/min, pressure was measured at the inlet and outlet of the filter, and change in pressure loss was recorded. The time until the pressure loss of the filter reached 2 kgf/cm$^2$ was designated as the filtering life.

Thereafter, powder was added, and pressure loss to the time when the filter was deformed was designated as pressure resistance. If filter deformation did not occur when the pressure loss of the filter reached 10 kgf/cm$^2$, then pressure resistance was designated as 10 kgf/cm$^2$.

(EXAMPLES 1–3)

A card web of a METSUKE (weight per unit area) of 20 g/m$^2$, a width of 80 cm, and made of parallel-type composite fibers consisting of polypropylene of a melt flow rate (MFR:230° C.) of 30 (g/10 min) and high density polyethylene of a melt flow rate (MFR:190° C.) of 25 (g/10 min), in which the fiber had a sectional circumference/diameter ratio of 70 percent, a fineness of 3 denier, and a cut length of 64 mm, was heated to 140° to 150° C. with a far infrared heater using an apparatus disclosed in Japanese Patent Publication No. 56-43139 so as to melt only the high density polyethylene, and was wound around a stainless steel pipe. When the wound diameter became 50 mm the winding pressure was suitably decreased using an apparatus to decrease linear pressure upon winding. After being cooled, the stainless pipe was pulled out and a hollow tubular fiber molding having an outer diameter of 70 mm, an inner diameter of 30 mm, and a length of 250 mm was cut. Three samples were fabricated under each set of conditions.

These fiber moldings were used as cartridge filters, and filtering accuracy, filtering life, and pressure resistance were measured using testing methods described above. As the representative value for the delamination strength of the outer layer region, a layer at a diameter of 60 mm was measured. Although the delamination strength of layers within a diameter of 50 mm or less were checked, layers were not delaminated upon application of a delaminating force of 1000 gf/5 cm.

The results of measurement are shown in Table 1.

(EXAMPLES 4–6)

The same card webs were produced from the same fibers used in Examples 1–3 using the same apparatus, and were wound around the stainless steel pipe in the same manner except that the winding pressure was changed in three steps. In these examples, the winding pressure was sequentially lowered at the times when the wound diameter became 44 mm and 58 mm. After being cooled, the stainless pipe was pulled out and a hollow tubular fiber molding of an outer diameter of 70 mm, an inner diameter of 30 mm, and a length of 250 mm was cut. Three samples were fabricated under each set of conditions.

These fiber moldings were used as cartridge filters, and filtering accuracy, filtering life, and pressure resistance were measured using testing methods described above. As the representative value for the delamination strength of the outer layer region, a layer at a diameter of 64 mm was measured, and as the representative value for the delamination strength of the intermediate layer region, a layer at a diameter of 51 mm was measured. Although the delamination strength of layers within a diameter of 44 mm or less were checked, layers were not delaminated upon application of a delaminating force of 1000 gf/5 cm.

The results of measurement are shown in Table 1.

(Comparative Examples 1 and 2)

The same card webs were produced from the same fibers used in Example 1 using the same apparatus, and were wound around the stainless steel pipe in the same manner except that the winding pressure was kept constant. After being cooled, the stainless pipe was pulled out and a hollow tubular fiber molding of an outer diameter of 70 mm, an inner diameter of 30 mm, and a length of 250 mm was cut. Three samples were fabricated under each set of conditions. The winding pressure in Comparative Example 1 was the same as that used in forming the inner layer region of Example 1 above, while the winding pressure in Comparative Example 2 was the same as that used in forming the surface layer region of Example 4 above.

These fiber moldings were used as cartridge filters, and filtering accuracy, filtering life, and pressure resistance were measured using testing methods described above. For the delamination strength of Comparative Example 1, it was confirmed that no regions of filtering layers delaminated upon application of a delaminating force of 1000 gf/5 cm. For Comparative Example 2, The delamination strength of layers at diameters of 64 mm, 51 mm, and 37 mm was measured as representative values for the surface layer, intermediate layer, and inner layer regions, respectively.

The results of measurement are shown in Table 1. For Comparative Example 2, since all filtering layer regions were formed to have almost the same delamination strength as that of the surface layer region of Example 4, gap diameters were large, and filtering accuracy became coarse. Therefore, since fine particles were not collected and the amount of collected particles became small, the apparent filtering life increased.

(EXAMPLES 7 and 8)

A web consisting of polypropylene having a melt flow rate (MFR:230° C.) of 280 (g/10 m/n) and a melting point of 164° C. as the core component, and linear low density polyethylene having a melt flow rate (MFR:190° C.) of 124 (g/10 min) and a melting point of 122° C. as the sheath component, at a composite ratio of 50/50, and an average fiber diameter of 12 μm, was formed using the sheath-and-core type melt-blown method, and was wound around the stainless steel pipe using the same apparatus in Examples 1–6 in the same manner. In Example 7, the winding pressure was lowered when the wound diameter became 50 mm, while in Example 8, the winding pressure was sequentially lowered when the wound diameter became 44 mm and 58 mm. After being cooled, the stainless pipe was pulled out and a hollow tubular fiber molding of an outer diameter of 70 mm, an inner diameter of 30 mm, and a length of 250 mm was cut.

These fiber moldings were used as cartridge filters, and filtering accuracy, filtering life, and pressure resistance were measured using testing methods described above. Delamination strength was measured using the same method as in Examples 1–3 for Example 7, and as in Examples 4–6 for Example 8.

The results of the measurements are shown in Table 1.

(Comparative Examples 3 and 4)

The same melt-blown web as used in Examples 7 and 8 was wound around the stainless-steel pipe using the same apparatus in the same manner except that the winding pressure was kept constant. After being cooled, the stainless pipe was pulled out and a hollow tubular fiber molding of an outer diameter of 70 mm, an inner diameter of 30 mm, and a length of 250 mm was cut. The winding pressure in Comparative Example 3 was the same as the pressure used when winding the inner layer region of Example 7, and the winding pressure in Comparative Example 4 was the same as the pressure used when winding the surface layer region of Example 8.

These fiber moldings were used as cartridge filters, and filtering accuracy, filtering life, and pressure resistance were measured using testing methods described above. For the delamination strength of Comparative Example 3, it was confirmed that no regions of filtering layers were delaminated upon application of a delaminating force of 1000 gf/5 cm. For Comparative Example 4, The delamination strength of layers at diameters of 64 mm, 51 mm, and 37 mm was measured as representative values for the surface layer, intermediate layer, and inner layer regions, respectively.

The results of measurement are shown in Table 1. For Comparative Example 4, since all filtering layer regions were formed to have almost the same delamination strength as that of the surface layer region of Example 8, gap diameters were large, and filtering accuracy became coarse. Therefore, since fine particles were not collected and the amount of collected particles became small, the apparent filtering life increased.

Since the cartridge filter of the present invention comprises a composite non-woven fabric formed by winding and laminating an inner layer region of which layers cannot be delaminated and an outer layer region or a surface layer region and an intermediate layer region of which layers can be delaminated by a force exceeding a certain value, and collects fine particles while classifying the fine particles using the outer layer or the surface layer and intermediate layer regions, stable filtering accuracy is achieved, and filtering life is improved.

Since layers of the laminated composite non-woven fabric constituting the filter are not deformed even if the filtering pressure rises, although the adhesive strength differs between layers in different regions, and since stable voids are held between layers, the filter performs stable filtration, and excels in pressure resistance.

TABLE 1

| | Delamination strength (gf/5 cm) | | | Filtering accuracy (μm) | Filtering life (min) | Pressure resistance (kgf/cm$^2$) |
|---|---|---|---|---|---|---|
| | | Outer layer | | | | |
| | Inner layer | Intermediate layer | Surface layer | | | |
| Example 1 | Not delaminated | 78.1 | | 27 | 60 | 4.8 |
| Example 2 | Not delaminated | 442.5 | | 25 | 79 | 5.4 |
| Example 3 | Not delaminated | 837.2 | | 26 | 65 | 6.0 |
| Example 4 | Not delaminated | 565.2 | 82.6 | 27 | 84 | 5.6 |
| Example 5 | Not delaminated | 678.8 | 240.2 | 26 | 81 | 5.7 |

TABLE 1-continued

| | Delamination strength (gf/5 cm) | | | Filtering accuracy (μm) | Filtering life (min) | Pressure resistance (kgf/cm²) |
|---|---|---|---|---|---|---|
| | | Outer layer | | | | |
| | Inner layer | Intermediate layer | Surface layer | | | |
| Example 6 | Not delaminated | 921.6 | 438.6 | 27 | 72 | 6.1 |
| Comp. Ex. 1 | Not delaminated | Not delaminated | Not delaminated | 25 | 34 | 7.6 |
| Comp. Ex. 2 | 78.8 | 84.1 | 90.3 | 42 | 105 | 2.8 |
| Example 7 | Not delaminated | 748.7 | | 16 | 48 | 6.7 |
| Example 8 | Not delaminated | 820.5 | 354.6 | 17 | 50 | 7.2 |
| Comp. Ex. 3 | Not delaminated | Not delaminated | Not delaminated | 16 | 26 | 7.5 |
| Comp. Ex. 4 | 324.3 | 348.8 | 360.1 | 37 | 95 | 4.2 |

"Not delaminated" indicates that the samples were not delaminated upon application of a delamination force of 1000 gf/5 cm.

What is claimed is:

1. A filter having an outer and an inner layer comprising a wound and laminated composite non-woven fabric containing heat fusible fibers, wherein the delamination strength between layers of the laminated composite non-woven fabric of said filter increases continuously or discontinuously from the outer layer toward the inner layer, the delamination strength of the inner layer exceeds 1000 gf/5 cm, and the delamination strength of the outer layer is 5 to 1000 gf/5 cm.

2. A filter according to claim 1, wherein the outer layer comprises a surface layer having a delamination strength of 5 to 500 gf/5 cm and made of the laminated composite non-woven fabric, and further comprises an intermediate layer located under said surface layer and having a delamination strength of 500 to 1000 gf/5 cm and made of the laminated composite non-woven fabric.

3. A filter according to claim 1, wherein the delamination strength of the surface layer region is 5 to 500 gf/5 cm, and the delamination strength of the inner layer exceeds 1000 gf/5 cm, and the delamination strength varies continuously within the region between these two regions.

4. A filter according to claim 1, wherein the composite non-woven fabric is a composite short-fiber non-woven fabric consisting of a high melting point component and a low melting point component, the difference between melting points of these components being at least 10° C.

5. A filter according to claim 1, wherein the composite non-woven fabric is a composite long fiber non-woven fabric consisting of a high melting point component and a low melting point component, the difference between melting points of these components being at least 10° C.

6. A filter according to claim 1, wherein the composite non-woven fabric is a melt-blown non-woven fabric consisting of a high melting point component and a low melting point component, the difference between melting points of these components being at least 10° C.

* * * * *